Sept. 27, 1966 J. J. LAURENT 3,275,819
POCKET ELECTRIC APPARATUS WITH CHARGEABLE BATTERY
Filed July 5, 1957 3 Sheets-Sheet 1
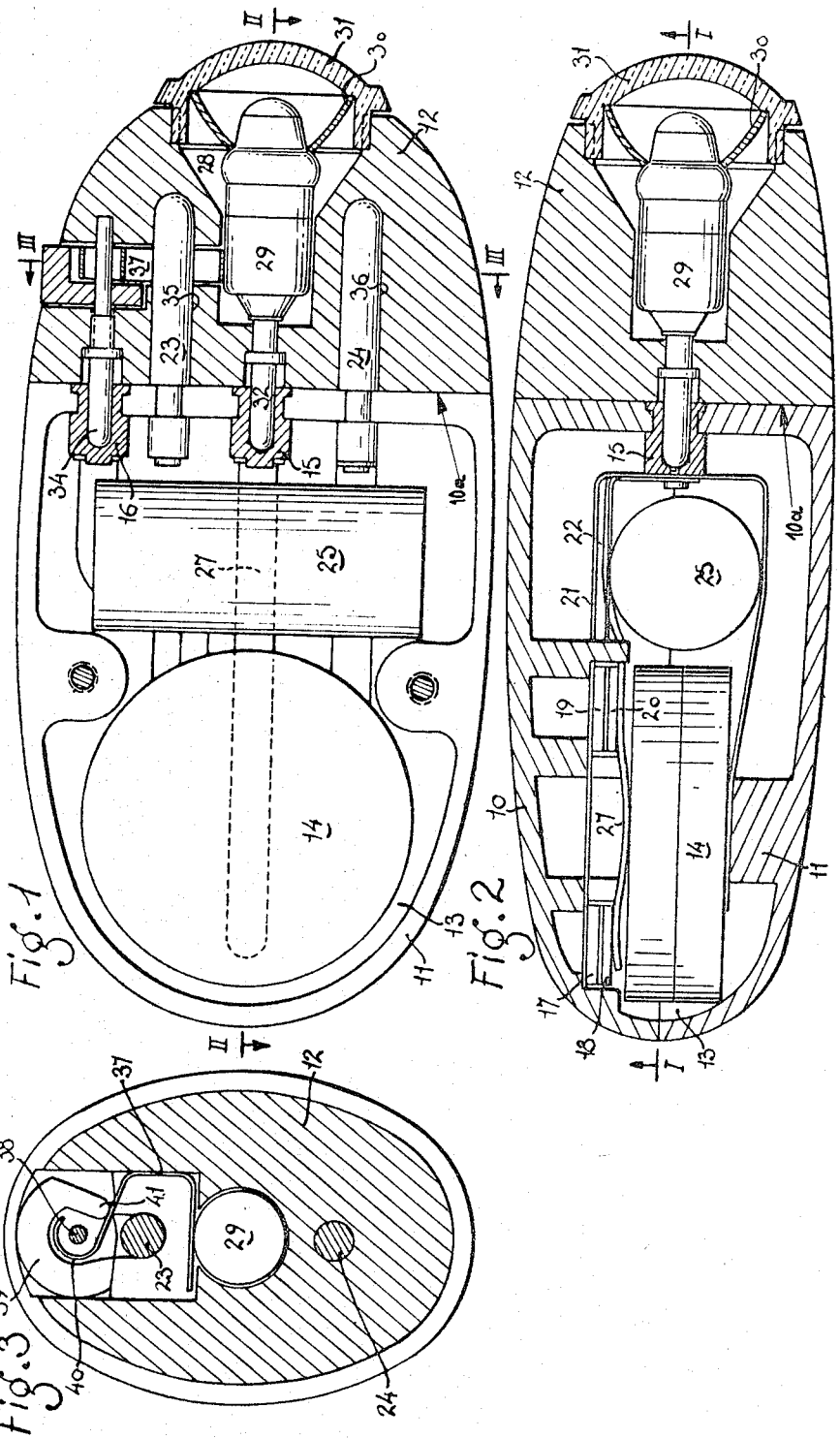

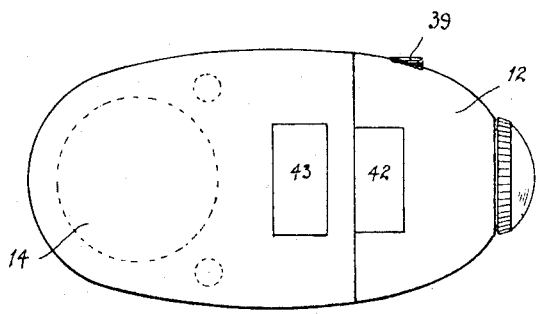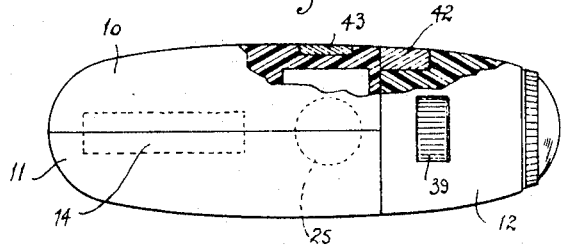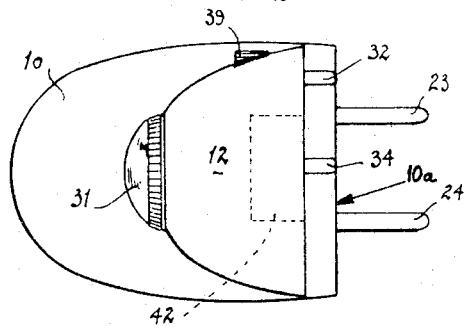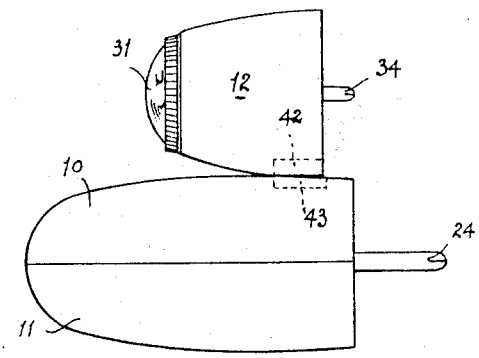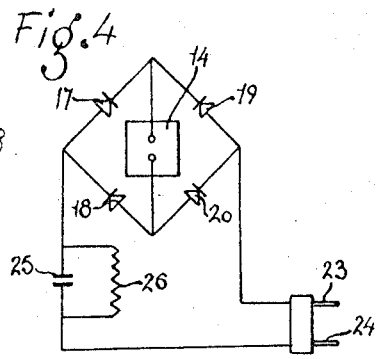

Sept. 27, 1966  J. J. LAURENT  3,275,819
POCKET ELECTRIC APPARATUS WITH CHARGEABLE BATTERY
Filed July 5, 1957  3 Sheets-Sheet 3

United States Patent Office 3,275,819
Patented Sept. 27, 1966

3,275,819
POCKET ELECTRIC APPARATUS WITH CHARGEABLE BATTERY
Joseph J. Laurent, Rue Cap Dangelle, Lourdes, France
Filed July 5, 1957, Ser. No. 670,145
Claims priority, application France, July 11, 1956, 718,402
14 Claims. (Cl. 240—10.65)

The present invention relates to a portable electric apparatus of small dimensions such for instance as a pocket lamp, a razor, a fan, etc.

This apparatus is of the general type comprising a housing formed of two interfitting elements, one of which containing an accumulator and the other the device to be controlled by this latter together with the corresponding electric circuit and connections and a switch.

It is remarkable notably in that it comprises a recharging device for the said accumulator, with or without a rectifier, permanently connected to said accumulator and incorporated in the element containing said latter, the different terminals intended to realize the connection of this recharging device with any outsidely situated feeding source being distinct from the terminals intended to feed the said controlled device, all of said terminals being located in or abutting into the separating surface between said two interfitting elements thereby affording that all the electric connections for recharging the accumulator and controlling the lamp, razor or the like proper are formed on or according to the said separating surfaces.

According to another feature of the invention, the said terminals consist of two pairs of plugs projecting in or out of the said separating surfaces.

According to a still other feature of the invention, each element is provided with a pair of plugs, which constitutes the only interfitting and assembling means between said two elements.

According to a preferred embodiment, the element containing said controlled device, such as a lamp for instance, has plug terminals fitting in suitable holes provided on the adjacent element and electrically connected directly with the accumulator, whereas the plug terminals pertaining to the recharging device and provided on the element including same are adapted to penetrate and to be concealed in suitable electrically insulated holes, for instance having a closed bottom provided on the said first element.

Numerous and considerable advantages afforded by the aforesaid apparatus become immediately apparent.

In the first place, and mainly in the case of a pocket lamp, the lamp proper is mounted on an element which is independent of the accumulator, without protruding outside of the general profile of the housing.

Should the mounting be different, it would be necessary, on the one hand, to provide an extension of the accumulator containing element for locating the lamp and its circuit, and, on the other hand, to use a supplementary element only intended to conceal the plugs of the recharging device. But this would involve an undue increase of length of the housing and the use of a simple supplementary concealing cap. According to the invention, the element carrying the lamp is used simultaneously as such a concealing cap.

Moreover it is an easy matter to separate the said elements of the housing and to use the apparatus for any other purpose.

Furthermore, the location of the lamp in an element which is independent of the accumulator permits of constructing a very handy apparatus, having a perfect stability due to the fact that the operator will hold the apparatus by its heaviest part, i.e. the one containing the accumulator.

A still other advantage resides in the fact that for recharging the accumulator it is not necessary to extract it from the housing.

On the other hand, it is compulsory before executing this latter recharging operation, to uncover the corresponding plugs by disassembling the said elements and this fact permits of automatically protecting the lamp or any other controlled device from any incidents or accidents such for instance as an undue increase of voltage which may always occur during this charging operation.

A still further advantage is due to the way of executing the interfitting and assembly of the said elements of the housing. This is executed by four plugs and this fact dispenses of course with the use of any other complementary connecting means.

The fact of performing all the electric connections in or according to the separating plane or surfaces of said elements of the housing permits of realising the element containing the accumulator as a completely closed tight unit. It is a known fact that great difficulties arise very often from the leakage of the receptacles containing the accumulator plates.

Furthermore the simplicity of the electric connections, the handy and compact shape of the apparatus and the absence of any non electrically utilised members or parts permit of considerably reducing the price thereof. It is also possible to make the different elements of moulded and welded synthetic material of any kind.

Other features and particulars of the invention will appear from the following specification.

In the annexed drawings given only by way of example:

FIGURE 1 is a longitudinal section of an apparatus according to the invention forming a pocket lamp;

FIGURE 2 is a section according to lines II—II of FIGURE 1;

FIGURE 3 is a cross section along the line III—III of FIGURE 1;

FIGURE 4 shows a scheme of the electric circuit of the recharging device;

FIGURE 5 is a plan view of a pocket lamp according to a modified embodiment;

FIGURE 6 is an elevational view with partial section of this modified embodiment;

FIGURE 7 is a plan view of the lamp according to this modified embodiment showing this latter when it is dismounted;

FIGURE 8 is an elevational view corresponding to FIGURE 7;

Figure 9:
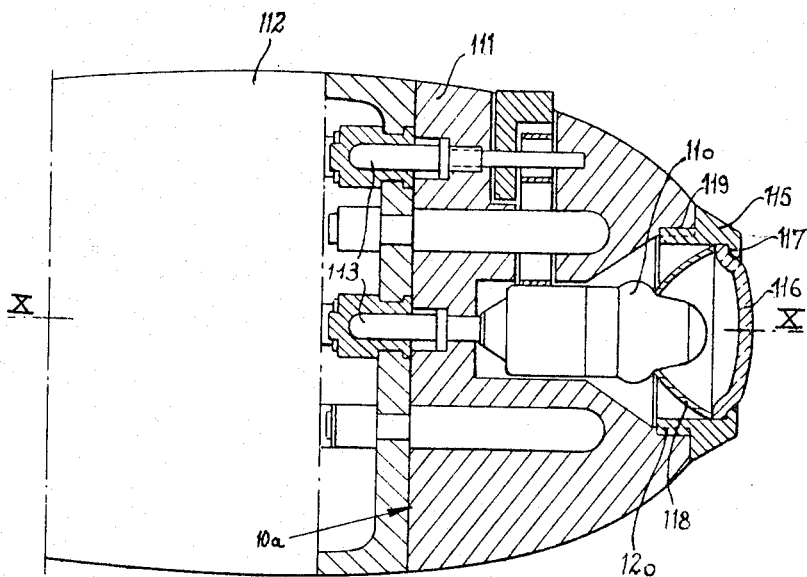
FIGURE 9 is a longitudinal section of the head of an electric pocket lamp according to a still further embodiment.

According to the embodiment represented in FIGURES 1 and 2, the electric portable apparatus such as a pocket lamp or the like comprises a housing or a body formed of two elements which are adapted to fit one to the other or one on the other. Each of these elements has a separating surface 10a along which they are adapted to fit together. One of these elements is formed of two interfitting parts 10 and 11 and encloses an electric accumulator 14 located in an inner hole 13 provided inside said two parts 10 and 11. The second element 12 forms the head of the apparatus and contains the device which is to be controlled, such for instance as the lamp proper 29.

The accumulator 14 is preferably of the "button" type having alkaline elements, but can of course be constituted by any other suitable device which could be tight or not tight. The terminals of the accumulator 14 are electrically connected to suitable holes 15–16 provided on the separating surface pertaining to elements 10–11. These holes are adapted to locate contact plugs 32 and 34 respectively belonging or pertaining to the circuit of lamp 29 or any other controlled device, said plugs 32–34 are formed as projecting parts or fingers extending from the separating surface 10a of element 12.

The accumulator 14 is associated with elements of a recharging device to which it has been connected permanently. These elements consist of rectifier cells 17, 18, 19, 20 connected by spring leaves 21 and 22 to suitable terminals or plugs 23 and 24 adapted to connect the recharging device to the feeding current which can be the usual city circuit.

These plugs 23 and 24 extend from the separating surface 10a pertaining to elements 10–11 and enable the operator to connect them with the usual terminals of the city circuit.

When the device is assembled, plugs 23–24 are located in suitable holes 35–36 which are insulated and provided in the separating surface 10a pertaining to the element 12. It is apparent that due to the locations of the different terminals and plugs of the apparatus, all the electric connections for recharging the accumulator or for controlling the lamp or the like can be located along or according to the planes or surfaces of separation 10a belonging to the two elements 12 and 10–11 of the entire housing of the apparatus and along which said elements are adapted to be assembled.

The rectifier cells 17 to 20 include in their circuit a condensor 25 with a resistance 26 according to the electric scheme of FIGURE 4.

According to a particular feature of the electric mounting, the connection of the accumulator 14 with hole 15 is performed by the resilient leaf 27 ensuring the maintenance in their respective positions of rectifier cells 17 to 20.

The head 12 of the apparatus which contains a cavity 28 receiving the lamp proper 29, a reflector 30 and a protecting device 31, is connected with the other element of the housing by means of the aforesaid plugs 23, 24, 32 and 34.

To this effect, head 12 is provided with the aforesaid two insulated holes 35, 36 for instance having a closed end in which plugs 23 and 24 can be located and concealed. Lamp 29 is in contact with the positive plug 32 which penetrates into the hole terminal 15 or like cavity of the housing which is electrically connected to the accumlator. It can be electrically connected with the leaf 37 of a switch connected to plug 34 which is located in the hole terminal 16. This switch is constituted by a S-shaped leaf 37 (FIGURE 3) the lower arm of which abuts on the lamp 29. The upper branch of leaf 37 surrounds axis 38 which constitutes an extension of the terminal 34 and serves as a support to the oscillating button 39. This button comprises a circular hole 40 which is concentric with axis 38 and terminates by a finger 41 contacting the intermediary part of leaf 37.

It is apparent that by turning button 39, finger 41 exerts a pressure on leaf 37 and obliges the upper branch thereof to contact axis 38 ensuring thus the passage of the electric current. A rotation in opposite direction of button 39 is favored by the elasticity or by the resiliency of leaf 37 and insures the interruption of the circuit of the lamp 29.

Preferably the housing containing the recharging device of the accumulator is executed as a single completely closed and tight unit.

On the other hand, head 12 comprising the lamp proper 29, the mounting support for this latter and the reflector 30, is adapted to have a protecting cover 31 including the lens which covers the entire assembly to be contained in the outer outline of head 12.

It is obvious that any other control device than the lamp could be provided in head 12. The head could contain an electric razor, a lighter, a fan, etc.

Moreover, the recharging device can be of any desired type and may contain or not a rectifier, as previously explained.

It will be seen that the use of an apparatus of the type described is very simple and practical. When accumulator 14 is out of use, it suffices to withdraw head 12 from the housing or to separate this head from the remaining part 10–11 so as to liberate plugs 23 and 24 of the recharging device. This latter can then be direcly connected by means of these plugs 23 and 24 to the electric recharging circuit such as the electric city circuit. As soon as the accumulator has been recharged head 12 is replaced on element 10–11 of the housing and the apparatus is once more ready to be used.

It is apparent that due to the mounting of rectifier cells 17 to 20, as represented in FIGURE 4, according to which these cells are connected in parallel on the feeding circuit, the accumulator can be connected in the centre of this mounting forming a bridge. The feeding or recharging current is introduced by the terminals 23 and 24 insuring the recharging of the accumulator 14 whereas the resistor 26 which has been mounted in parallel with the condenser 25 avoids any undesirable discharges of this latter.

According to the modification of FIGURES 5 to 8, a permanent magnet or like magnetic member 42 has been provided in head 12. The wall of the element 10–11 has been provided at 43 with an iron plate having preferably the same dimensions as the magnet 42.

Instead of locating the magnet in the head and the metallic plate in the second element, the mounting can be reversed and the magnet can be placed in element 10–11 and the plates in the head 12.

The presence of the magnet 42 permits of holding the lamp or affixing it on an outer piece for instance an iron piece of an automobile. This permits of lighting a certain zone and of freeing the hands of the operator.

When the recharging of the accumulator 14 is executed, the head 12 has to be separated from element 10–11 and generally the operator does not know where to place it during this operation which might last a certain time. The results thereof is the risk to loose this head. With the arrangement described and represented it suffices to separate the head 12 from element 10–11 and to bring the magnet 42 on plate 43 (FIGURES 7 and 8). The head is thus fixed during all the necessary time. When the recharging is terminated the head is separated from the above element and can be once again fitted on this latter by means of plugs 23, 24.

Obviously, magnet 42, as well as plate 43, can be provided at any place of the elements 10–11 and 12. Preferably they are incorporated into the walls of these elements in the places where the interior equipment of the lamp is not incorporated. The securing of magnet 42 and of plate 43 on the lamp can be executed by any adequate means. They can be incorporated during the moulding of the elements 10–11 and 12 or they can be incorporated in suitable holes provided at this end or still they can be secured by sticking or by bolts.

Figure 10:
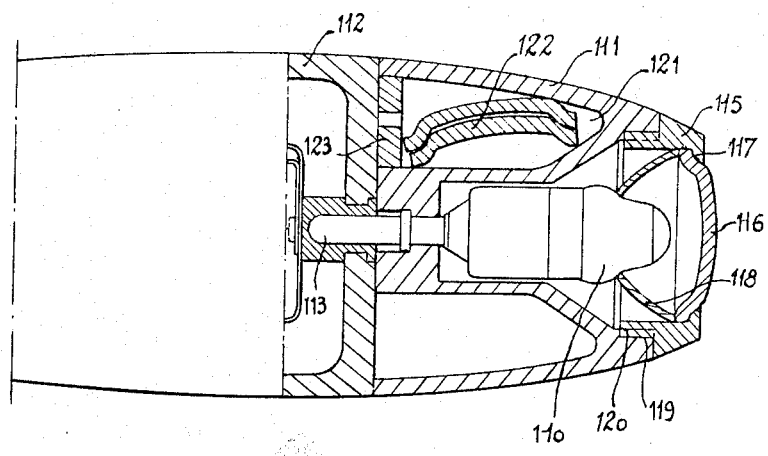
FIGURE 10 is a section according to line X—X of FIGURE 9.

In the embodiment of FIGURES 9 and 10 the lamp 110 has been mounted in a head 111 which fits on element 112 by means of plugs 113.

In front of the lamp has been provided a securing device consisting of two elements: a support 115 and a lens 116. The lens 116 is removable. It abuts by its edge on a shoulder 117 of support 115. On the other hand, it is held in place by reflector 118 in turn secured by lamp 110.

Support 115 comprises a thread 119 adapted to fix this latter by means of a threaded orifice 120 in the head 111. This support has a generally ring-shaped form and is made of transparent material in which has been incorporated any kind of phosphorescent material.

It is obvious that this material will be excited by the light of lamp 110 and will conserve its luminosity even if the lamp is not in use and will render this latter visible even in the dark.

In a general way the phosphorescent ring shaped member can be provided around the lamp proper or on lens 116.

Lens 116 which is made of glass or any synthetic material is replaceable or interchangeable. To this effect the lamp includes a series of different lenses of different colors. These lens are preferably situated inside head 111 and an empty space 121 which have been provided between the support of the lamp proper and the external wall. At 122, two different lenses have been shown, for instance a red one and a green one which can be substituted for lens 116 by simply unscrewing ring 115 and replacing it back on its place.

In order to maintain these lenses 122 in the said empty space 121, this latter can be closed by easily removing plug 123.

Obviously the present invention is by no means limited to the embodiments herein described and represented.

What I claim is:

1. A pocket electric apparatus with chargeable battery for operating an electrically controlled device such as a lamp, a razor or a fan, comprising a housing consisting of two interfitting elements, each of said elements having a separating surface, a recharging device for said chargeable battery comprising a rectifier and an electric circuit permanently interconnecting said chargeable battery and recharging device, said chargeable battery, recharging device and circuit being located in a first of said elements, the device intended to be controlled by the electric current produced by said chargeable battery being located in a second of said elements, electric means with a switch for feeding said last mentioned device by said current, distinct terminals for feeding said recharging device and electric means, said terminals comprising plug-means and hole means extending from and located in the respective separating surfaces of the respective elements to afford thereby that the recharge of said accumulator and the feeding of the said device shall be effected exclusively by electric connections situated on said surfaces.

2. A pocket electric apparatus with chargeable battery for operating an electrically controlled device such as a lamp, a razor or a fan, comprising a housing consisting of two interfitting elements, each of said elements having a separating surface, a recharging device for said chargeable battery, comprising a rectifier and an electric circuit permanently interconnecting said chargeable battery and recharging device, said chargeable battery, recharging device and circuit being located in a first of said elements, the device intended to be controlled by the electric current produced by said chargeable battery being located in a second of said elements, electric means with a switch for feeding said last mentioned device by said current, distinct terminals for feeding said recharging device and electric means, said terminals comprising plug-means and hole means extending from and located in the respective separating surfaces of the respective elements, to afford thereby that the recharge of said chargeable battery and the feeding of the said device shall be effected exclusively by electric connections situated on said surfaces, said plugs and holes constituting the only means for the interfitting and the connections of said elements.

3. A pocket electric apparatus with chargeable battery for operating an electrically controlled device such as a lamp, a razor or a fan, comprising a housing consisting of two interfitting elements, each of said elements having a separating surface, a recharging device for said chargeable battery comprising a rectifier and an electric circuit permanently interconnecting said accumulator and recharging device, said chargeable battery, recharging device and circuit being located in a first of said elements, said device intended to be controlled by the electric current produced by said accumulator being located in a second of said elements, electric means with a switch for feeding said last mentioned device by said current, distinct terminals for feeding said recharging device and electric means, the said terminals comprising a first couple of plugs extending from the separating surface of said first element intended to connect the said recharging device to the feeding circuit of the usual city circuit, two corresponding insulated holes in said separating surface on the said second element intended to locate said plugs when the elements are assembled to operate said controlled device two further plugs electrically connected to said electric feeding means of said controlled device extending from said separating surface of said second element; a couple of holes on the separating surface of said first element for locating said last mentioned plugs, contact pieces in said holes electrically connected with said chargeable battery to realise the electric connection between the chargeable battery and the controlled device, and a switch provided on said second element for interrupting the action of said feeding electric means.

4. Apparatus as claimed in claim 1 wherein the separating surface between the said two interfitting elements is a plane surface.

5. Apparatus according to claim 1 wherein the element containing the chargeable battery forms a completely closed solid and tight unit.

6. An electric pocket lamp with rechargeable battery comprising a housing consisting of two interfitting elements, each of said elements having a separating surface, a recharging device for said chargeable battery comprising rectifier and an electric circuit permanently connecting said chargeable battery and recharging device, all of these parts being contained in a first of said elements, an assembly comprising a feeding circuit connectable with the said chargeable battery, a switch, an electric lamp, a light reflecting means and a lens, located in a second of said elements, two plug like terminals on said latter element extending from its separating surface electrically connected to said feeding circuit of the lamp, two corresponding holes on the said first element and on the separating surface thereof, said holes forming electric terminals being electrically connected to the chargeable battery, and intended to realise an electric connection between the lamp and the said battery, two further plug like terminals on said first element extending from the separating surface thereof and electrically connected to the said recharging device and corresponding electrically insulated holes on the second element and on the separating surface thereof for locating the said further plugs when the elements are assembled, each one of said elements forming a complete solid and compact unit adapted to be assembled together by means of said plugs and holes according to their separating surfaces, which might be a plane, whereas the lamp and lens are substantially contained in the outside profile of the entire pocket lamp.

7. Apparatus according to claim 1 wherein magnetic means are incorporated in one at least of said interfitting elements.

8. Apparatus according to claim 7 wherein magnetic means are incoroprated in one of said interfitting elements and means of magnetic metal are incorporated in the adjacent element.

9. A pocket lamp according to claim 6 wherein a phosphorescent ring shaped member is provided around the lamp proper.

10. A pocket lamp according to claim 9 wherein the said ring shaped member is provided on the lens.

11. A pocket lamp according to claim 6 comprising a dismountable fastening member to hold the lens and a cavity in the corresponding element containing spare lenses which might be of different colors.

12. A pocket electric apparatus with chargeable battery for operating an electrically controlled device, comprising a housing consisting of two interfitting elements, each of said elements having a separating surface, a recharging device for said chargeable battery comprising a rectifier and an electric circuit permanently interconnecting said chargeable battery and recharging device, said chargeable battery, recharging device and circuit being located in a first of said elements, the device intended to be controlled by the electric current produced by said chargeable battery being located in the second of said elements, electric means for feeding said last mentioned device by said current, distinct terminals for feeding said recharging device and electric means, said terminals comprising plugmeans and hole means extending from and located in the respective separating surfaces of the respective elements to afford thereby that the recharge of said battery and the feeding of the said device shall be effected exclusively by electric connections situated on said surfaces.

13. In a portable two-unit electrical utility device, a load unit including an electrical utility element and receptacle means, a power unit including a rechargeable battery, a rectifier, prong means, and circuit connection means electrically connecting said battery, rectifier and prong means to enable charging of said battery upon insertion of said prong means into an outlet receptacle of a source of alternating current, said prong means being insertable into said receptacle means to positively interconnect said units into a unitary structure, and alternatively, into said outlet receptacle to recharge said battery through said circuit connection means, and circuit means carried by said units and electrically connecting said element and battery when said units are interconnected, as aforesaid.

14. In a portable two-unit electrical flashlight, a load unit including an electric lamp and a receptacle, a power unit including a rechargeable battery, a rectifier, prong means, and circuit connections electrically connecting said battery, rectifier and prong means, said prong means being insertable into said receptacle of said load unit to positively interconnect said units into a single unitary structure and, alternatively, into an outlet receptacle for a source of alternating current, to recharge said battery through said rectifier and said circuit connections, when said units are separated, and circuit means carried by said units and directly electrically connecting said battery with said lamp when said units are interconnected by said prong means.

References Cited by the Examiner

UNITED STATES PATENTS

| | | | |
|---|---|---|---|
| 1,506,302 | 8/1924 | Hopkins | 240—10.6 |
| 2,491,031 | 12/1949 | Burgess | 321—8 |
| 2,628,339 | 2/1953 | Werner | 320—2 |
| 2,642,520 | 6/1953 | Coolidge et al. | 240—10.6 |

OTHER REFERENCES

Ser. No. 427,480, Zdansky (A.P.C.), published June 15, 1943.

JOHN F. COUCH, *Primary Examiner.*

DELBERT B. LOWE, GEORGE NINAS, LLOYD McCOLLUM, *Examiners.*

F. B. LEONARD, S. WEINBERG, A. I. BREIER, *Assistant Examiners.*